United States Patent [19]

Mailloux et al.

[11] Patent Number: 5,383,036
[45] Date of Patent: Jan. 17, 1995

[54] ENHANCEMENT OF MULTIPLE COLOR IMAGES WITHOUT COLOR SEPARATION ERROR BY INVERSE SYMMETRICAL TEMPLATE MATCHING

[75] Inventors: Louis D. Mailloux, Mountain View; Sofia Filshtinsky, Saratoga, both of Calif.

[73] Assignee: Xerox Corporation, Stamford, Conn.

[21] Appl. No.: 128,509

[22] Filed: Sep. 29, 1993

[51] Int. Cl.[6] .................................... H04N 1/46
[52] U.S. Cl. ................................ 358/518; 358/515; 358/534; 382/30
[58] Field of Search ............... 358/518, 515, 532, 447, 358/504, 537, 536, 534; 382/30, 54, 44, 45

[56] References Cited

U.S. PATENT DOCUMENTS

| | | | |
|---|---|---|---|
| 3,997,912 | 12/1976 | Zsagar | 358/504 |
| 4,355,337 | 10/1982 | Sekigawa | 358/284 |
| 4,437,122 | 3/1984 | Walsh et al. | 358/166 |
| 4,450,483 | 5/1984 | Coviello | 358/166 |
| 4,679,039 | 7/1987 | Neil et al. | 340/728 |
| 4,780,711 | 10/1988 | Doumas | 340/728 |
| 4,847,641 | 7/1989 | Tung | 346/154 |
| 5,107,331 | 4/1992 | Collell et al. | 358/536 |
| 5,247,352 | 9/1993 | Nagler et al. | 358/515 |

FOREIGN PATENT DOCUMENTS 59-52969  3/1984  Japan ................................ 358/536

Primary Examiner—Edward L. Coles, Sr.
Assistant Examiner—Madeleine Anh-Vinh Nguyen
Attorney, Agent, or Firm—R. Christine Jacobs

[57] ABSTRACT

A method for enhancing the contour fidelity of printed images of two or more colors is described, which includes obtaining a digital representation of the color image and finding color separations of each color. Each color separation is enhanced by a single set of inverse symmetrical templates, the set including templates in which the second template is always the inverse of the first, and the third and fourth templates are 180 degree rotations of the first two. The resulting smoothed color separations are recombined into an enhanced image without separation error.

9 Claims, 21 Drawing Sheets

Fig.17

ENHANCEMENT OF MULTIPLE COLOR IMAGES WITHOUT COLOR SEPARATION ERROR BY INVERSE SYMMETRICAL TEMPLATE MATCHING

FIELD OF THE INVENTION

The present invention relates to smoothing contours in images comprising multiple color separations on printers and other optical display systems having high gamma, photosensitive recording media, and more particularly, to relatively inexpensive and easily implemented methods and means for increasing the precision with which these display systems spatially position edges and other types of transitions between colors in the images they display. More specifically, the invention pertains to economical and technically attractive techniques for smoothing edges and eliminating separation errors in images of at least two colors.

BACKGROUND OF THE INVENTION

Images often contain many transitions. For instance, black and white and other dual tone images have transitions at the boundaries between their foreground features and their backgrounds, such as the transitions that demark line edges, font contours, and halftone dot patterns. Color images commonly include still additional transitions at the boundaries between differently colored foreground features. Consequently, the perceived quality of monotone and color prints tends to be strongly dependent upon the precision with which the printing process spatially positions these transitions.

In response to these technical challenges, template matching techniques have been proposed for more precisely controlling the size, positioning and number of picture elements ("pixels") that are printed on xerographic photoreceptors to render bitmapped images. For example, template matching has been developed for reducing the severity of certain printing artifacts, such as the observable stairstep-like scan structure (commonly referred to as "jaggies") that sometimes degrades the xerographically printed appearance of nonvertical and nonhorizontal lines. Examples of template matching techniques which may improve the output of images may be found in Tung, U.S. Pat. No. 4,847,641, "Piecewise Print Image Enhancement for Dot Matrix Printers," issued Jul. 11, 1989, and Walsh et al., U.S. Pat. No. 4,437,122, "Low Resolution Raster Images," issued Mar. 13, 1984. Template matching effectively overcomes some of the sampling errors that are caused by the use of input data that is too coarse to accurately represent the higher spatial frequency content of the image.

However, in multiple color images, processing is generally performed on the pixels of a single color, called a color "separation." Standard template matching techniques, when applied to color separations, tend to introduce "separation errors." FIGS. 1-6 illustrate the problem of separation errors. FIG. 1 shows a portion 10 of a two-color image composed of "R" pixels (for example, red pixels) and "G" pixels (for example, green pixels). This image could further be composed of black pixels and other color or colors pixels. For the purposes of this application, black pixels may be considered colored pixels. In processing a color image, the colors are separated into multiple images, each of a single color, called "separations." FIG. 2 shows the G color separation 20 of image 10. The areas of image 10 which are G are separated into a separate image surrounded by blank pixels, shown in FIG. 2 as white pixels. For the purposes of this application, white pixels may be considered interchangeable with blank pixels. FIG. 3 shows the R color separation 30 of image 10.

FIG. 4 shows a smoothed output of G color separation 20 in an expanded pixel pattern such as might be produced by a template matching scheme such as described in Walsh et al. Traditional template matching techniques for smoothing images tend to fill in internal corners and round off protruding corners. FIG. 5 shows the smoothed output of R separation 30 in an expanded pixel pattern such as produced by Walsh et al.

When color separations are enhanced independently, even for images with no previous errors, the resulting combination of the separations may produce separation errors, particularly at corners and other contours.

FIG. 6 shows the result of recombining the two smoothed, expanded color separations of FIGS. 4 and 5. Although complimentary in most respects, it may be seen that there are errors at pixels 42-45, where the separations overlap, and at blank pixels 46 and 48, where neither color is represented.

Many of the ROS's (raster output scanners) that have been developed for xerographic printing employ a single beam or a multi-beam laser light source for supplying one or more intensity modulated light beams, together with a scanner (such as a polygon scanner) for cyclically deflecting the modulated laser beam or beams across a photoreceptor in a "fast scan direction" while the photoreceptor is being advanced simultaneously in an orthogonal "process direction." In practice, each of the laser beams typically is brought to focus on or near the photoreceptor surface to provide a substantially focused "scan spot." The scan spot, in turn, scans the photoreceptor in accordance with a predetermined scan pattern because the fast scan deflection of the laser beam or beams vectorally sums with the process direction motion of the photoreceptor. Indeed, the scan pattern is dependent upon and is determined by the scan rate (scan/sec) of the scanner, the spot size that is employed, and the process speed (inches/sec) of the photoreceptor. Such a scan pattern produces an exposure pattern because the scans are superpositioned on the photoreceptor, regardless of whether the scans simultaneously or sequentially expose the photoreceptor. Accordingly, it is to be understood that the present invention applies to printers and other display means that employ single beam or multi-beam ROS's, even though this disclosure features the single beam/single scan spot case for the sake of simplification.

It is an object of the present invention to enhance the contour resolution of features in multiple color images without creating separation errors in the output subpixels. In response to this object, a set of templates is provided which, when applied equally to each color, result in complimentary corrections. The problem of separation errors is solved by providing a single template set to be used to enhance each color separation of the image, the set including templates in which the second template is always the inverse of the first, and the third and fourth templates are 180° rotations of the first two.

SUMMARY OF THE INVENTION

The present invention provides a method for enhancing the contour fidelity of printed images of two or more colors. The method includes obtaining a digital representation of the color image, and finding color separations of each color. Each color separation is enhanced by a set of inverse symmetrical templates, and the resulting smoothed color separations are recombined into an enhanced image without separation error.

The template set comprises a first template comprising pixels of a target color representing an edge of an image at an angle, adjacent pixels of a blank color, and other pixels of indeterminate color. The inverse symmetrical template set further comprises a second template comprising pixels in which said target color pixels of said first template are replaced by blank color pixels, and said blank color pixels of said first template are replaced by pixels of a target color, a third template comprising the first template shifted by 180°, and a fourth template comprising the second template shifted 180°.

The following description, the drawings and the claims further set forth these and other objects, features and advantages of the invention.

BRIEF DESCRIPTION OF THE DRAWINGS

FIG. 17 shows another two-color image portion.

DETAILED DESCRIPTION

An "image" is a pattern of light. An image may include characters, words, and text as well as other features such as graphics. An "image output device" is a device that can provide an image as output.

Each location in an image may be called a "pixel." In an array defining an image in which each item of data provides a value, each value indicating the color or intensity of a location may be called a "pixel value." An edge of an image may be described as a "contour" that may have a "slope" or angle.

Figure 1:
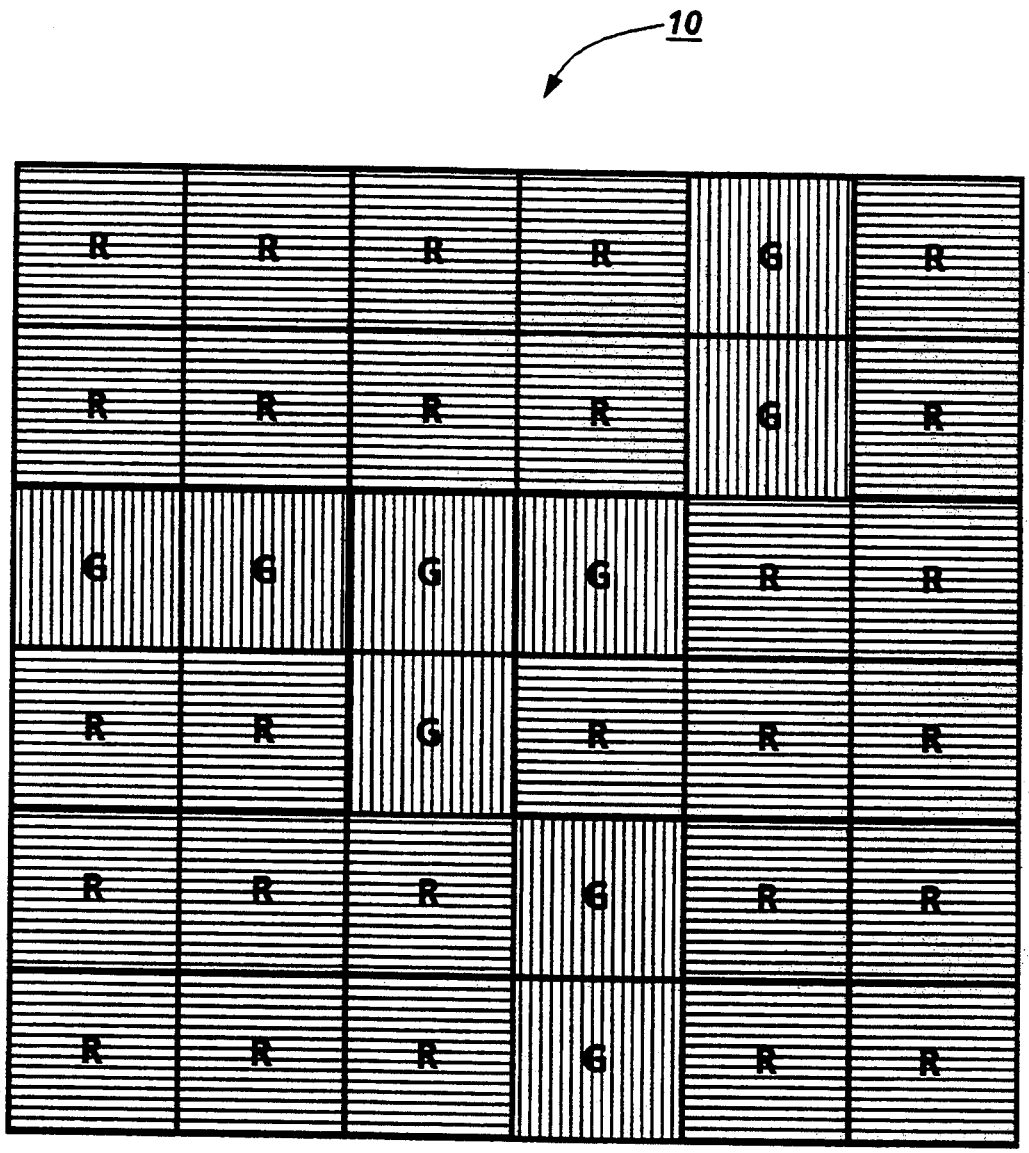
FIG. 1 shows a portion of a two-color image.
Figure 2:
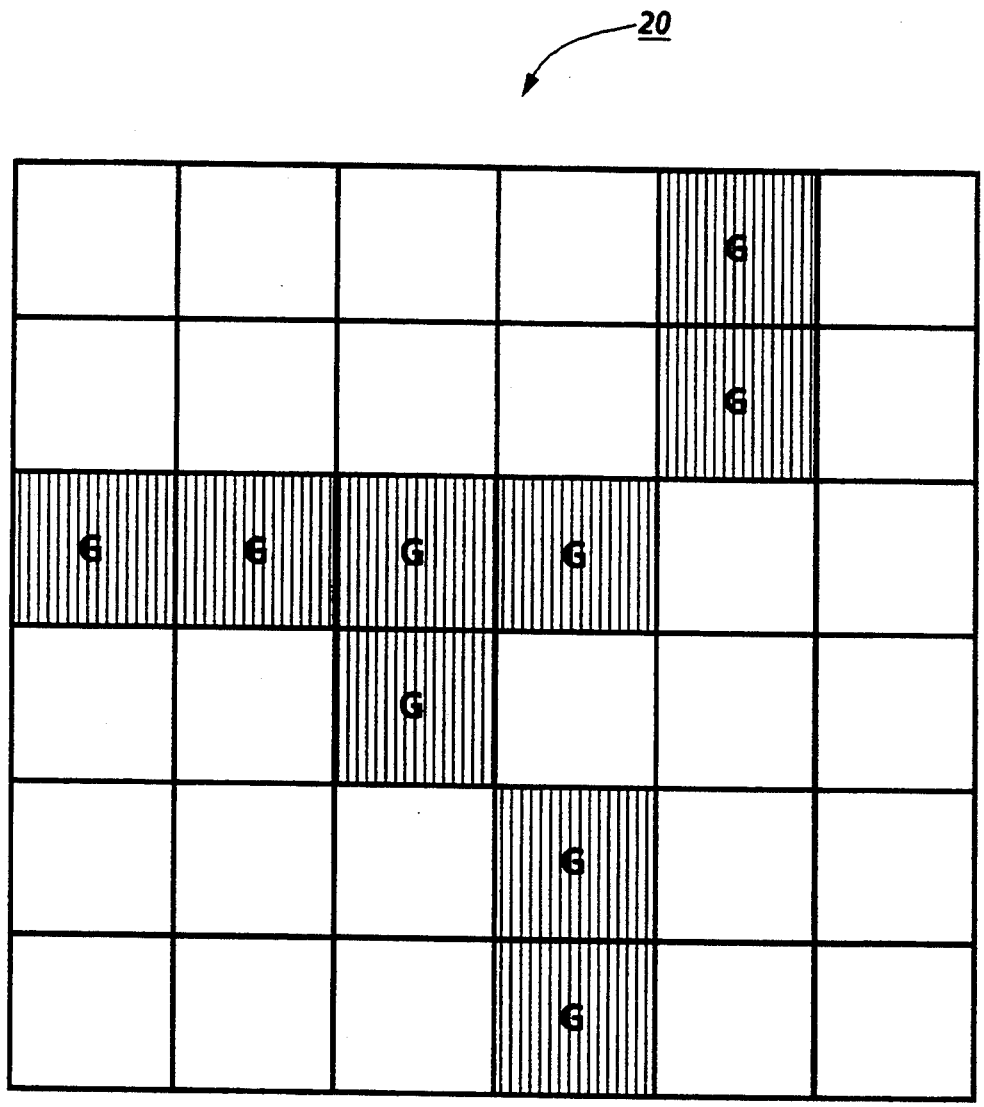
FIG. 2 shows a first color separation of the image portion of FIG. 1.
Figure 3:
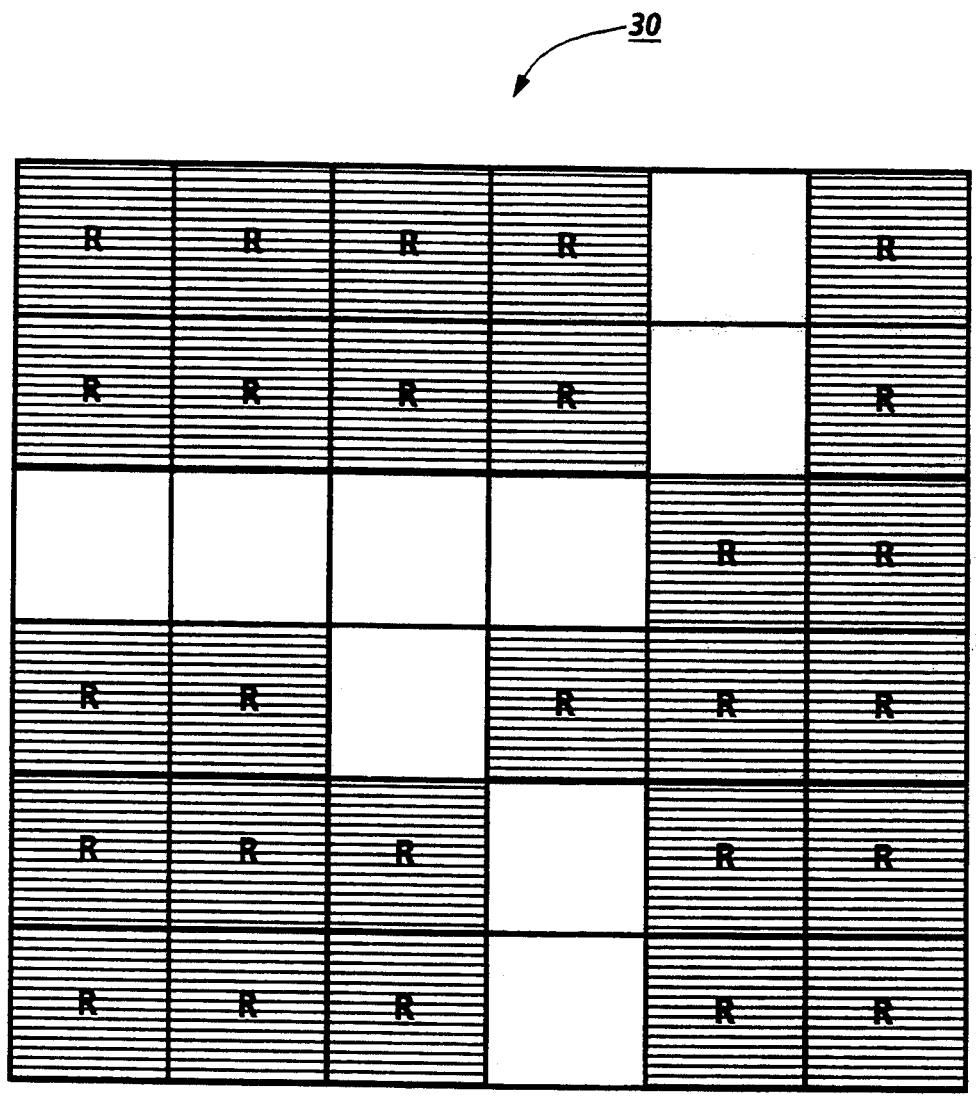
FIG. 3 shows a second color separation of the image portion of FIG. 1.
Figure 4:
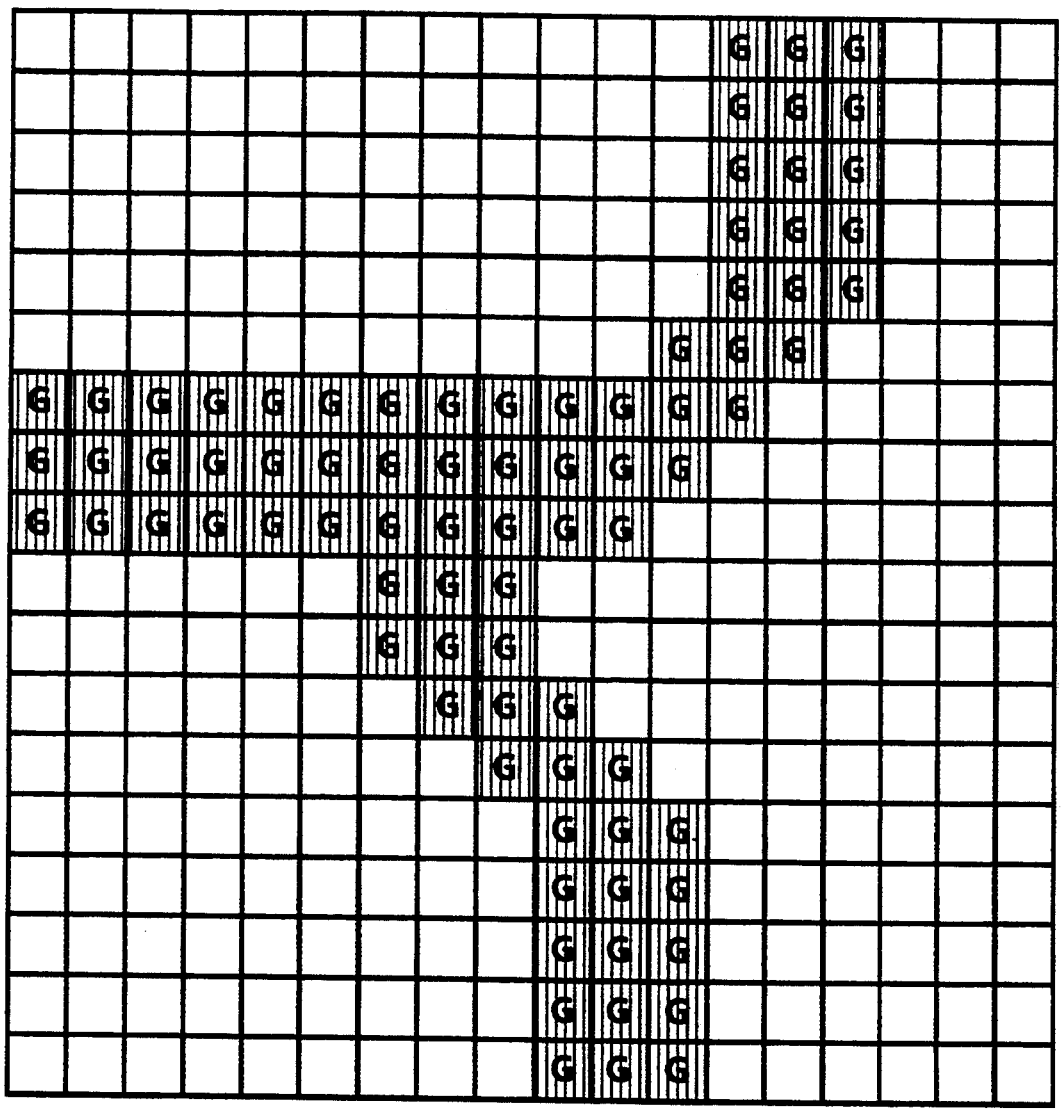
FIG. 4 shows the color separation of FIG. 2, smoothed by a prior smoothing method.
Figure 5:
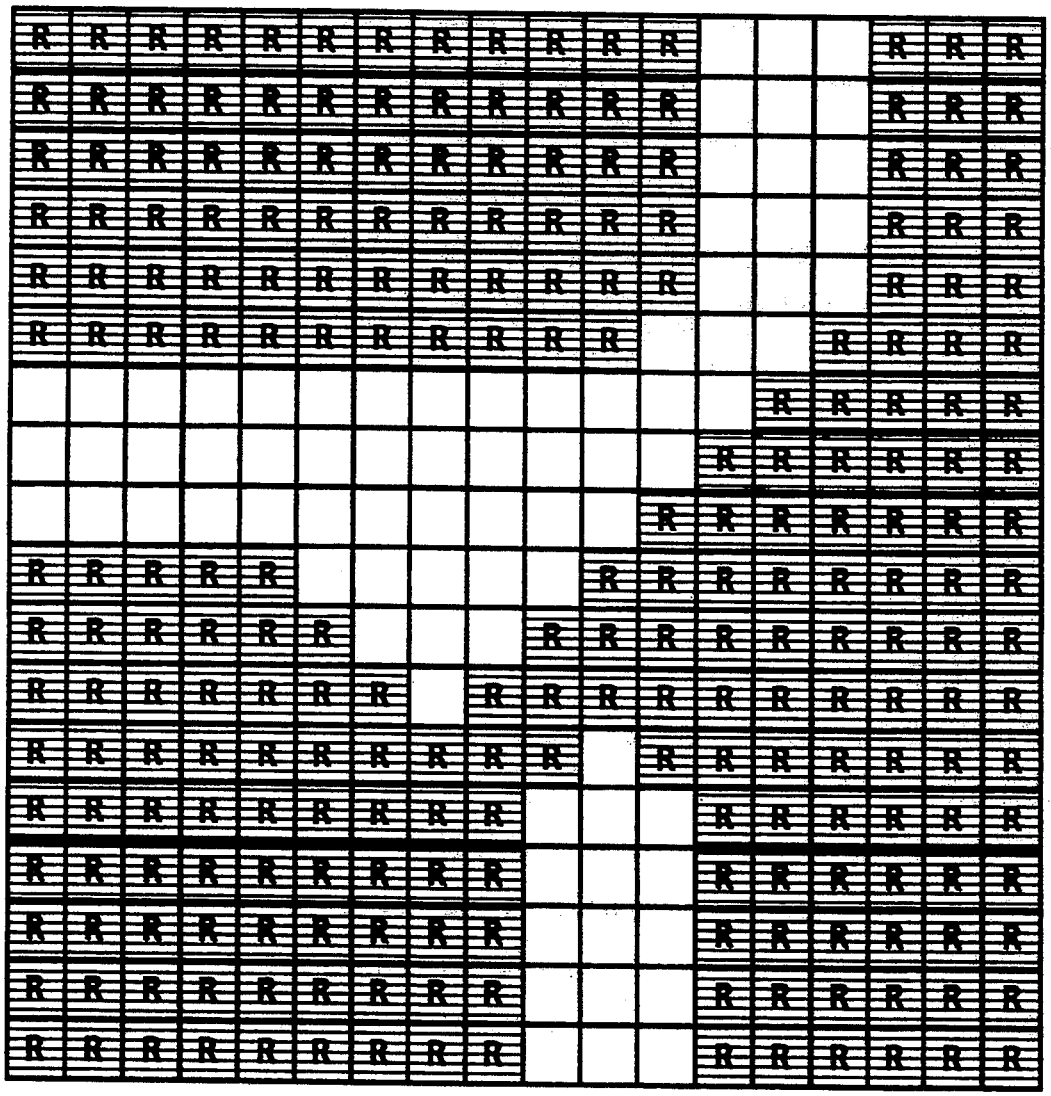
FIG. 5 shows the color separation of FIG. 3, smoothed by a prior smoothing method.
Figure 6:
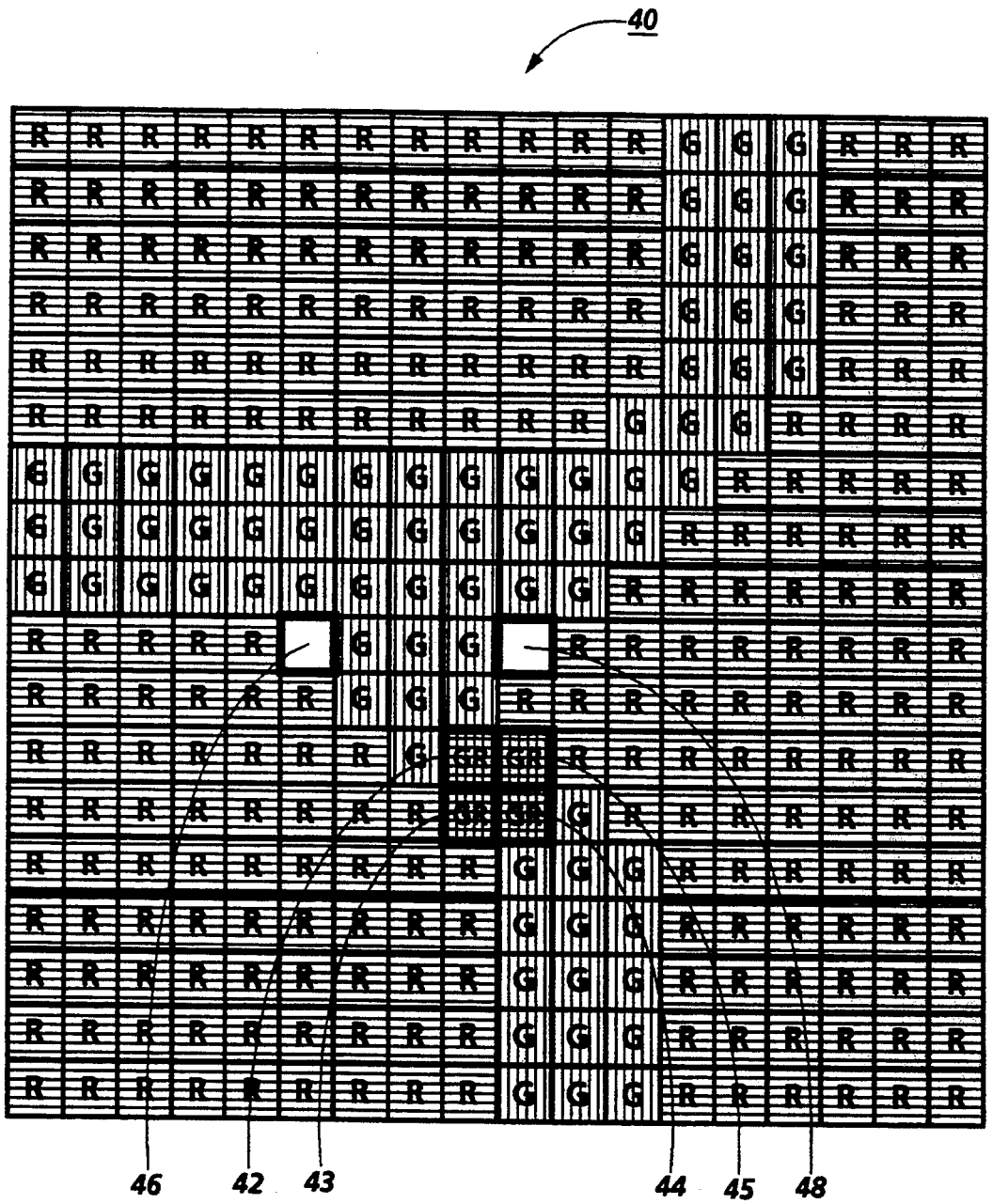
FIG. 6 shows an image portion composed of the the smoothed color separations of FIGS. 4 and 5.
Figure 7:
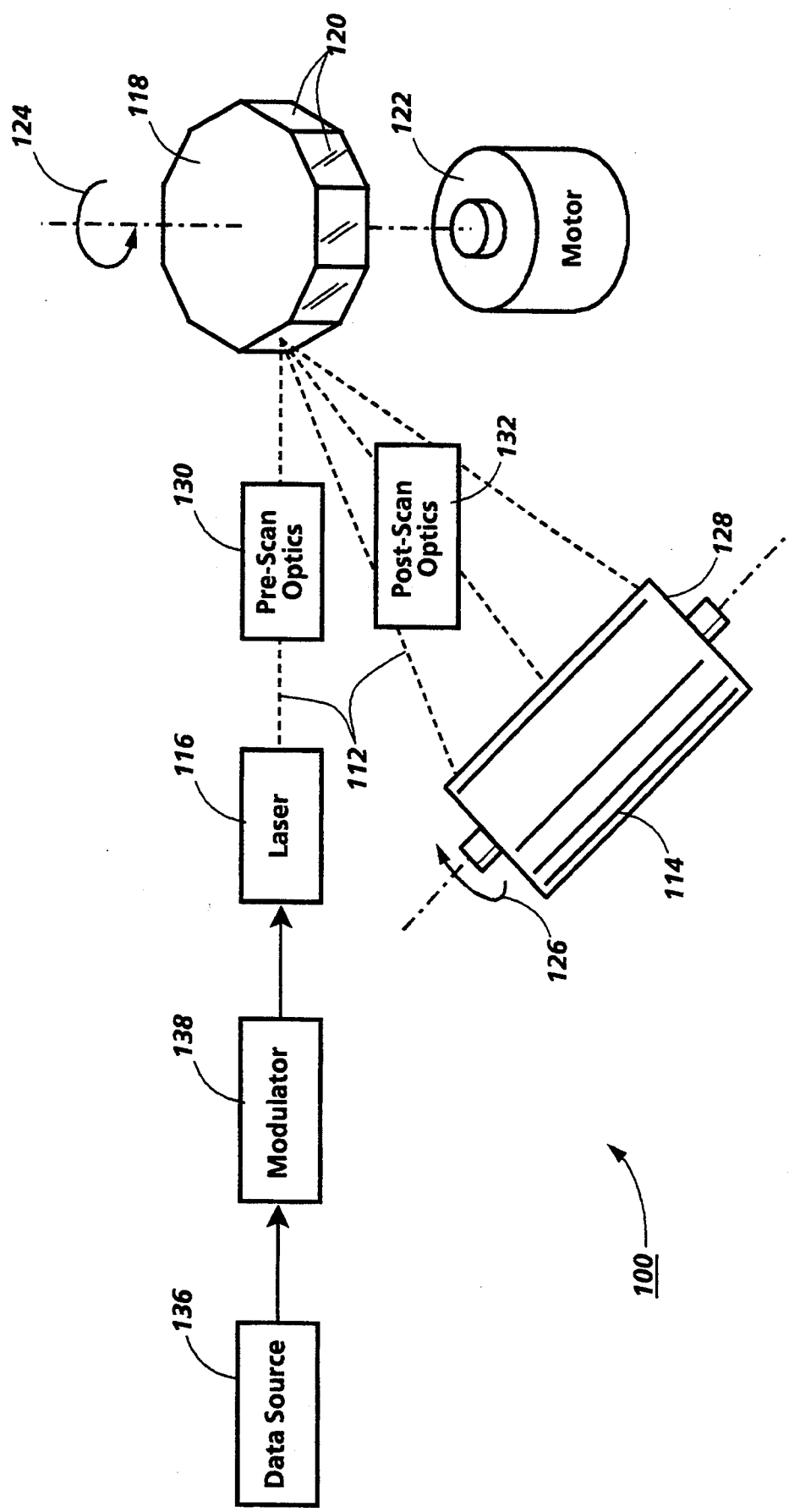
FIG. 7 shows general features of a laser printer.

FIG. 7 shows general features of a laser printer. In FIG. 7, there is illustrated a more or less conventionally configured optical system 100 of a xerographic print engine (not shown). The flying spot ROS scans a data modulated light beam 112 over a xerographic photoreceptor 114 in accordance with a predetermined raster scanning pattern. To that end, the ROS comprises a laser diode 116 for emitting the light beam 112 in the visible or invisible (e.g., infrared) band of the spectrum, together with a polygon scanner 118 that has a plurality of nearly identical, mirror-like exterior sidewalls or "facets" 120.

In keeping with standard practices, there is a motor 122 for rotating the scanner 118 about its central axis, as indicated by the arrow 124, at a substantially constant angular velocity. The scanner 118 is optically aligned between the laser 116 and the photoreceptor 114, so its rotation causes the laser beam 112 to be intercepted and reflected from one after another of the scanner facets 120, with the result that the beam 112 is cyclically swept across the photoreceptor 114 in a fast-scan direction. The photoreceptor 114, on the other hand, is advanced (by means not shown) simultaneously in an orthogonal, process direction at a substantially constant linear velocity, as indicated by the arrow 126, so that laser beam 112 scans the photoreceptor 114 in accordance with a raster scan pattern. As shown, the photoreceptor 114 is coated on a rotating drum 128, but it will be apparent that it also could be carried by a belt or any other suitable substrate.

Typically, the ROS additionally includes pre-scan optics 130 and post-scan optics 132 for bringing the laser beam 112 to a generally circular focus proximate the photoreceptor 114 and for providing any optical correction that may be needed to compensate for scanner wobble and other optical irregularities. Preferably, the optical aperture of the ROS is sufficiently large to avoid excessive truncation of the laser beam 112 because the beam 112 then comes to a generally circular or elliptical focus with a Gaussian intensity profile. However, the broader aspects of this invention are not limited to any specific scan spot geometry or intensity profile. Accepted design principles indicate that the spatial frequency power spectrum of the scan spot profile should not have significant spatial frequency components outside the spatial frequency passband of the imaging system, but the scan spot can otherwise be tailored to satisfy a variety of system requirements.

The amplitude, duty cycle, and/or pulse width of the laser beam 112 is serially modulated (collectively referred to herein as "intensity modulation") in accordance with successive multi-bit digital data values. These data values are clocked out of a data source 136 serially in response to data clock pulses which are time synchronized with the scan of the scan spot from bitmap-location-to-bitmap-location within the raster scan pattern. Thus, the data clock frequency can be selected (by means not shown) to map the data onto the raster scan pattern at any desired magnification, using either the same or different magnifications in the fast scan and the process directions. The data may be preprocessed (by means not shown) for the printing of halftoned images and/or text and other types of line art, so the data source 136 generically represents any suitable source of raster data for intensity modulating the laser beam 112. The drive current for the laser diode 116 is serially modulated by modulator 138 in accordance with the data values that are clocked out of the data source 136, thereby intensity modulating the laser beam 112 at the data clock rate in accordance with those data values.

The fast scan positioning precision of the print engine 100 can be increased, if desired, by dynamically adjusting the frequency of the data clock to compensate for positioning errors that tend to be caused by motor hunt (i.e., variations in the angular velocity of the scanner 118), polygon signature characteristics (variations in the angular velocities at which the different facets 120 of the scanner 118 sweep the scan spot across the photoreceptor 114 from a start-of-scan position to an end-of-scan position), and scan nonlinearities (i.e., localized variations in the linear velocity of the fast scan, which are caused by variances in the geometric relationship of the scanner 18 to spatially distinct segments of any given scan line).

In order to print low resolution images on a higher resolution printer, the images must be processed in order to enhance the fidelity and increase the density of the low resolution images. A limited amount of fidelity may be restored to the low resolution image using an image enhancement technique such as template matching. Such enhancement techniques generally produce an enhanced resolution output by providing an enhanced bit or set of bits for each bit of the input image. These patterns are also typically dependent upon the characteristics of the photoreceptor of the printer for which the enhanced image is developed. Depending on the higher resolution printer desired, different enhancement sets may be desired. For example, on a high addressability printer, enhancement may be made in the fast-scan direction, while on an increased resolution printer enhancements may be made in both the fast scan and process directions. Hereinafter, a method for enhancing a 300×300 pixel image for printing on a 600×600 (2× resolution) printer will be discussed.

As previously discussed, multiple color images may be processed by first separating the image into multiple separations each of a single color, and processing that single color image. As was shown in relation to FIGS. 1–6, this independent processing may result in separation errors once the enhanced color separations are recombined.

Figure 8:
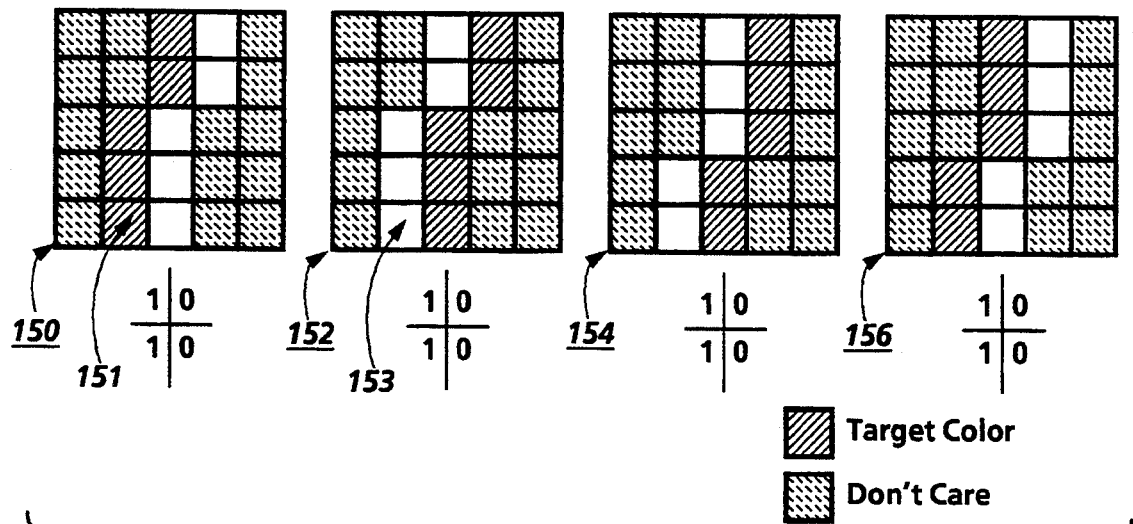
FIG. 8 shows a template set according to the invention.

FIG. 8 shows a template set illustrating inverse symmetry templates, which may be used to overcome the problem of introduction of separation errors. The templates are user to indicate pixels which need correction. In the present case, the central pixel of the template is the target pixel for correction. In FIG. 8, template 150 describes a template with a set of pixels 151 of a target color in a near vertical line, with a blank color pixel adjacent to the right of each target color pixel. Pixels to either the right or left of the target color edge or the blank edge are undetermined—they may be either the target color or blank for the template match. Template 150, therefore, may detect a target color pixel line of a single pixel width, or an image feature or the target color with a single width line of another color intersecting it, or an edge of an image feature of the target color next to a blank area or feature of another color. Although the template sets are herein described as 5 pixel by 5 pixel templates, clearly other size templates may be used to detect more or less precisely the angle of the contour of the image feature. In the template set herein described, the central pixel is enhanced to correct the image, but clearly other pixel may be chosen for enhancement, depending on the size of the templates and the characteristics of the printer to be used.

Template 152 shows the inverse to template 150. In the case of template 152, the target color pixels 151 of template 150 correspond to blank pixels 153. Each pixel that was blank in template 150 is made the target color. Undetermined pixels remain undetermined.

Figure 9:
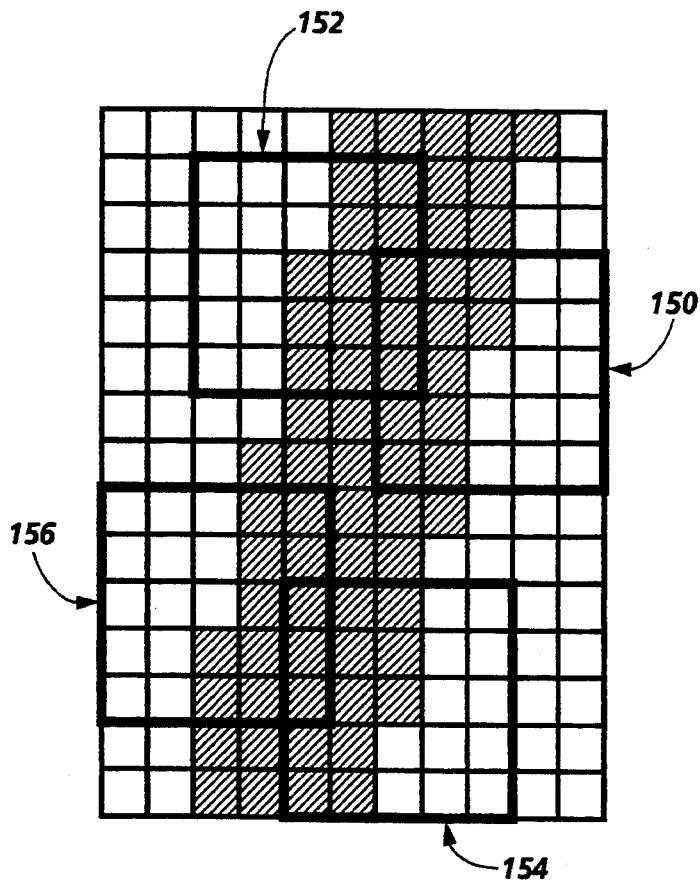
FIG. 9 describes the application of the template set to an image.

Template 154 is comprised of template 150, turned or shifted by 180°. Similarly, template 156 is comprised of template 152 shifted 180°. As shown in FIG. 9, this ensures that for essentially "straight" lines at an angle, both sides of the line will be corrected by using the four templates.

Along with each template in FIG. 8 is shown an accompanying correction. In the case shown, corrections are based on a printer of two-to-one (2×) resolution. The template corrections are inversely symmetrical—a match with template 152 will give an exactly inverse correction from a match with template 150. Clearly the same inventive principles may be applied to other printers, and the correction values for that particular printer determined.

Figure 10:
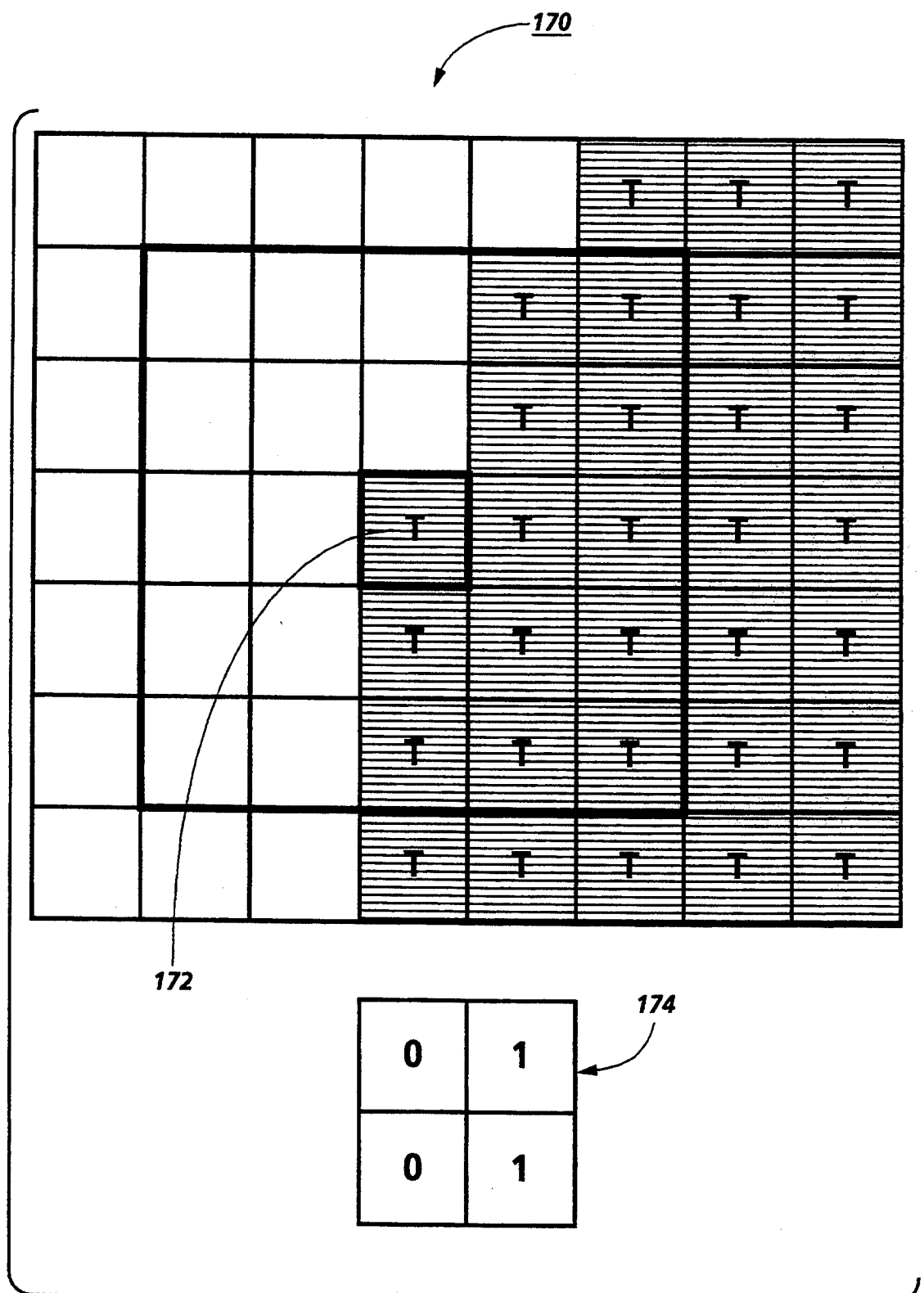
FIG. 10 shows correction made to a center pixel of a matched template.

For each center pixel, the high resolution printer will print four subpixels of the values given below each template when a match is made, as shown in FIG. 10. For example, when template 152 is matched with a feature in the separation image 170, the output 174 representing the center pixel 172 will be enhanced with the value 0011, where a 1 designates a subpixel of the target color, and a 0 designates a blank subpixel.

Figure 11:
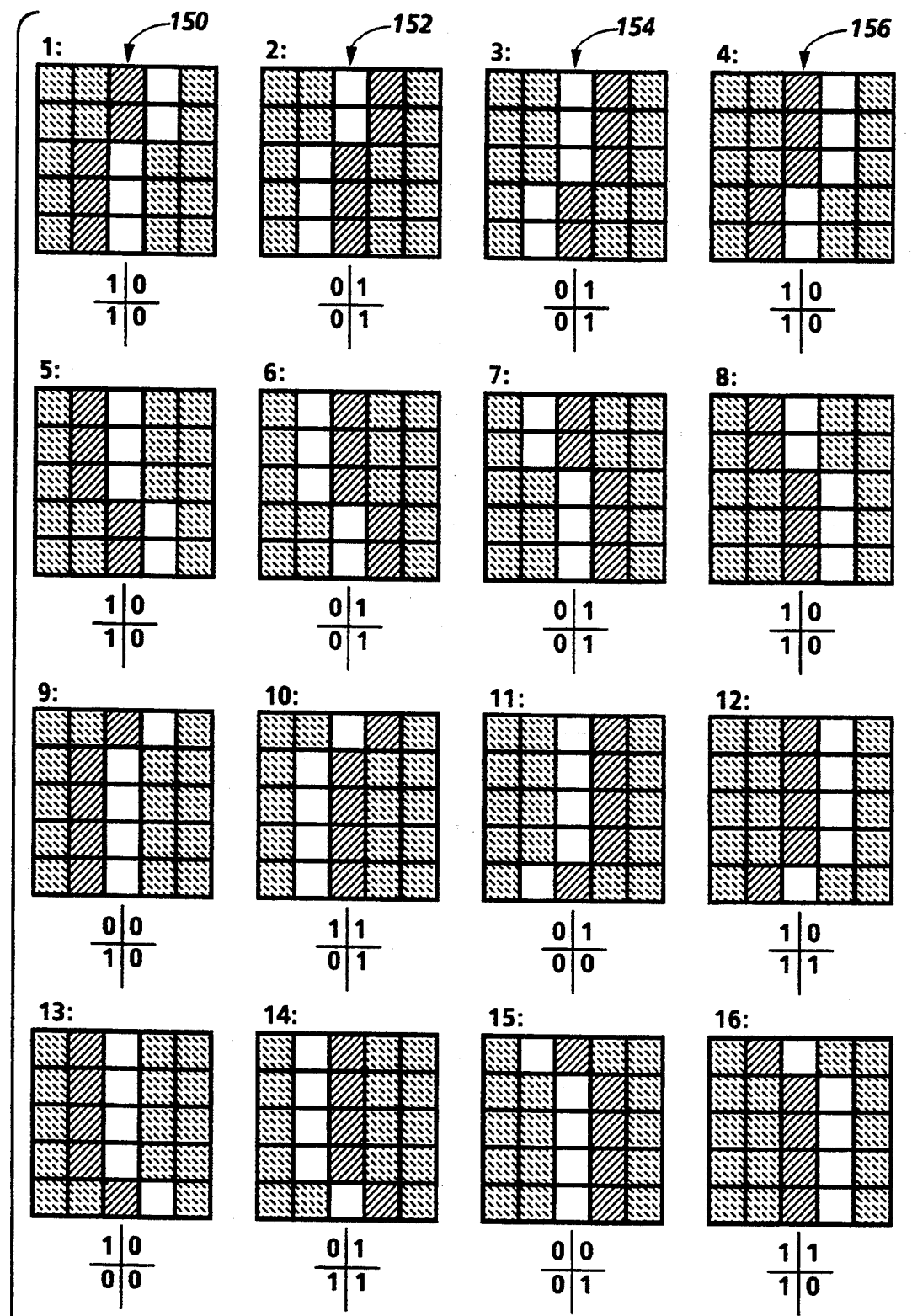
FIG. 11 shows a template group of near vertical templates.

FIG. 11 shows a group of near-vertical inverse symmetrical templates 1–16 according to the present invention. For each template in the group there is a set of inverse symmetrical templates related to it. Templates 1–4 match templates 150, 152, 154, and 156 shown in FIG. 8.

Figure 12:
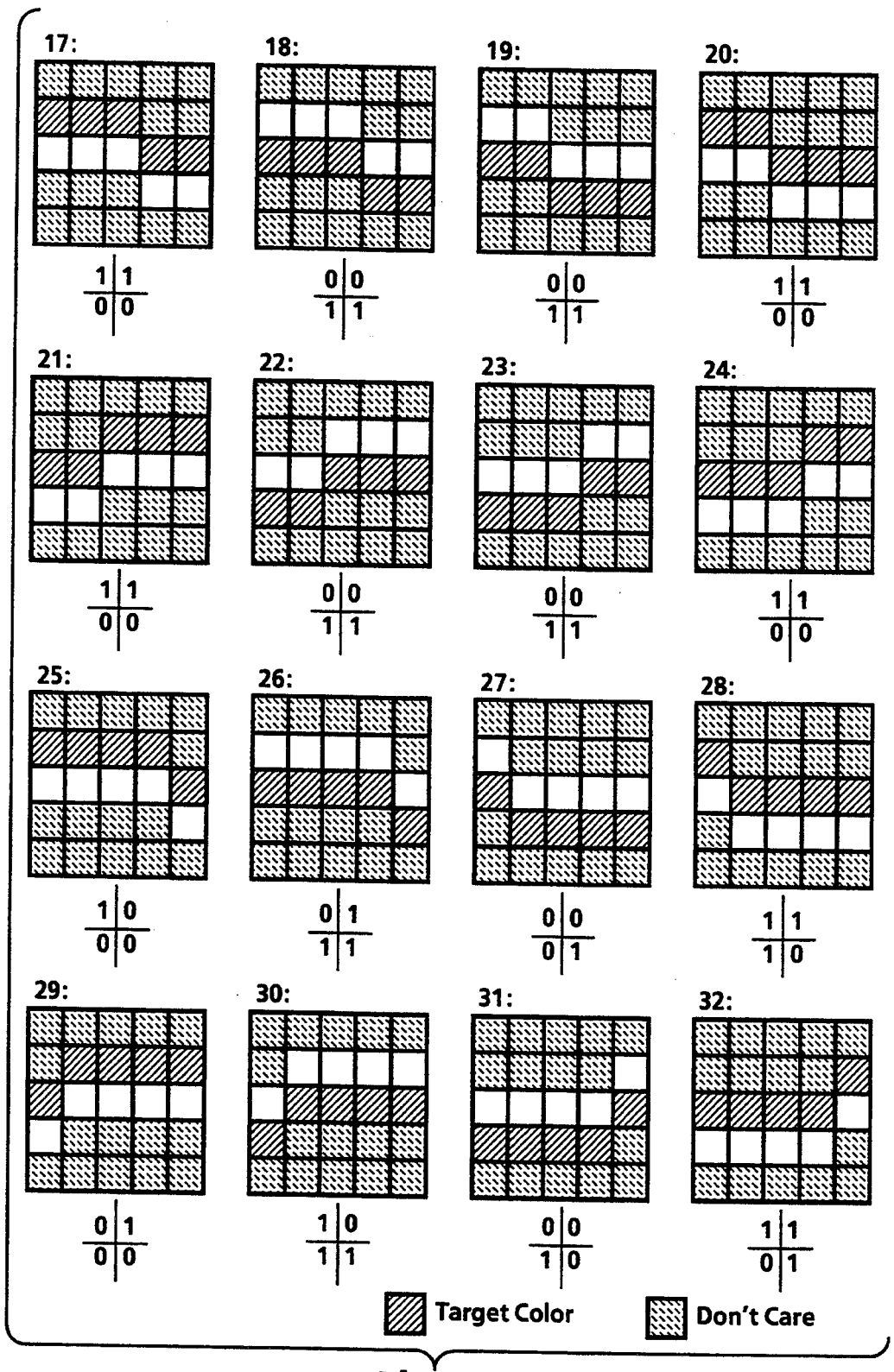
FIG. 12 shows a template group of near horizontal templates.

FIG. 12 shows a group of near-horizontal inverse symmetrical templates 17–32.

Figure 13:
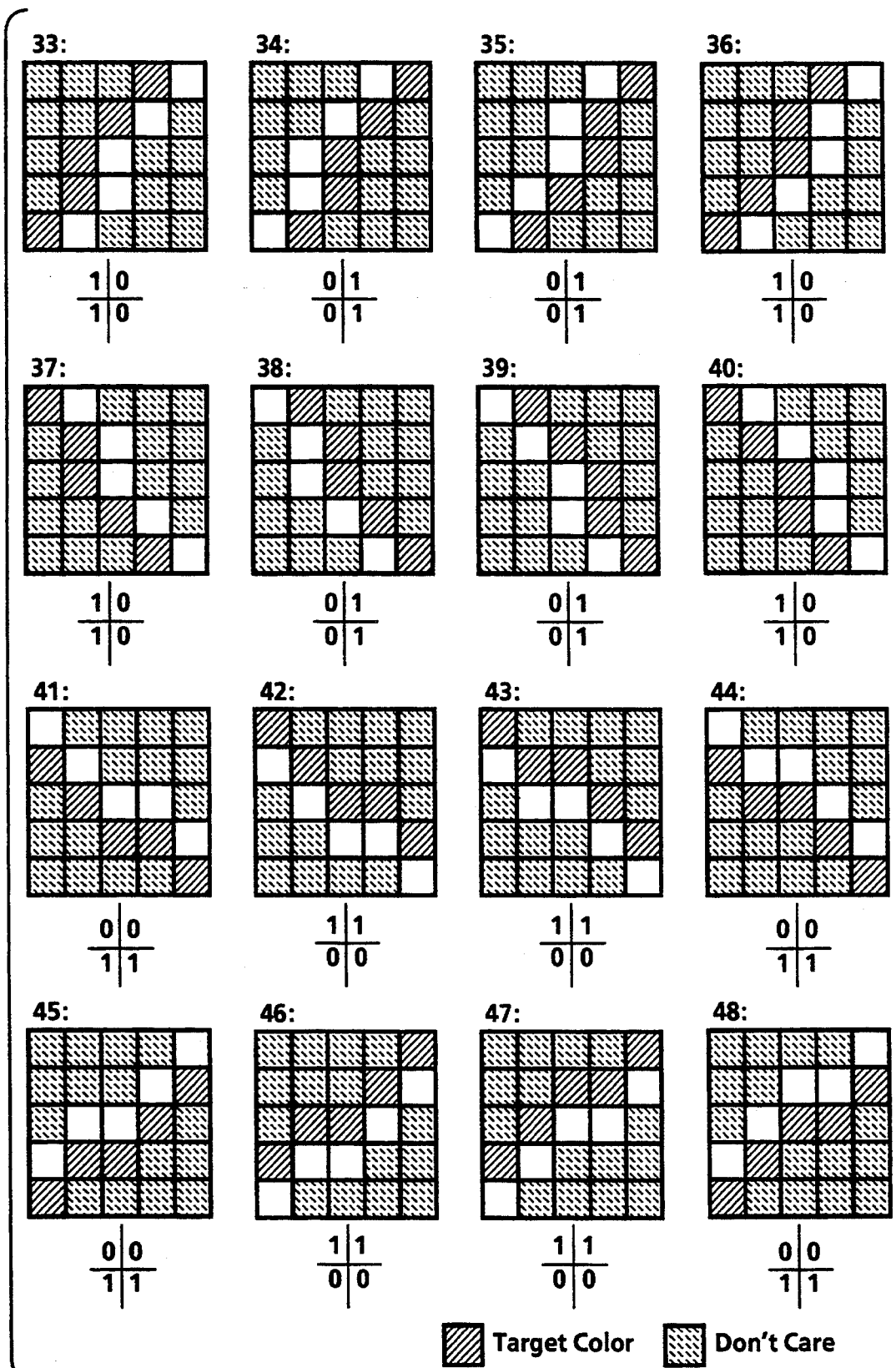
FIG. 13 shows a template group of other near vertical and near horizontal templates.

FIG. 13 shows templates 33–48 for lines at larger angles from vertical and horizontal. Along with each template is an accompanying correction for a 2× resolution printer as described in relation to FIG. 10.

Clearly, groups of inverse symmetrical template sets may be determined for lines at a variety of angles, and for features other than straight lines. Similar template sets, with adjusted correction values, may be used on different printers.

Figure 14:
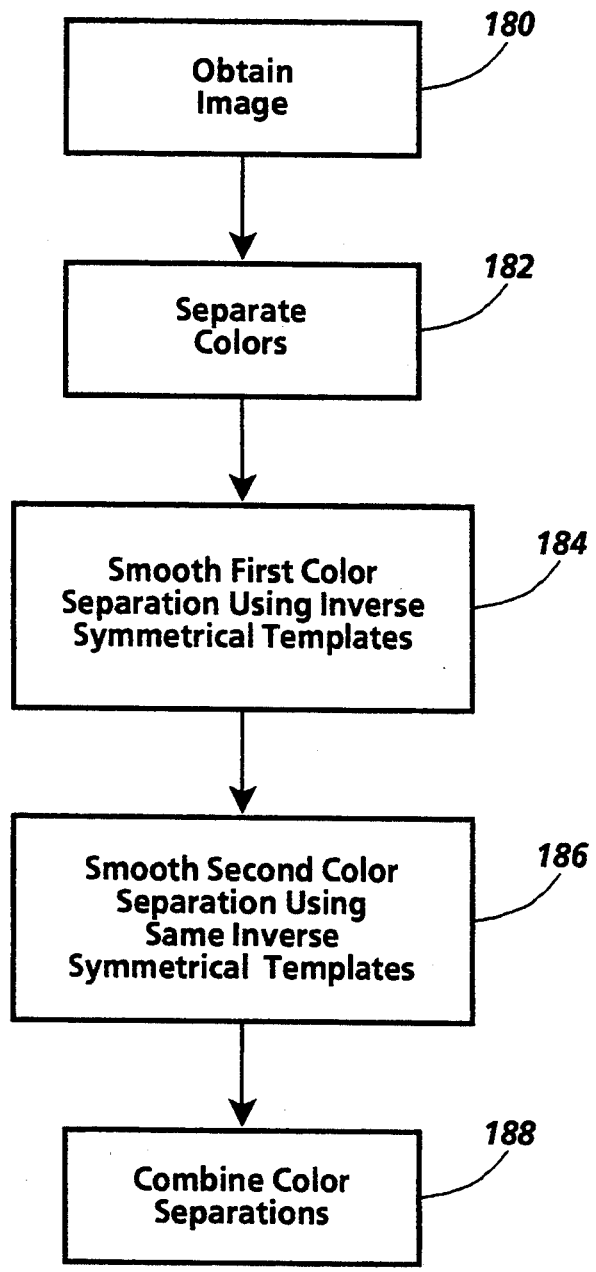
FIG. 14 describes the general method of color separation enhancement of the present invention.

FIG. 14 describes the method of the invention. In the step in box 180 an image is obtained. The image may be a digital image which has been scanned and stored or created digitally. In the step in box 182, color separations of each color are created.

The step in box 184 enhances the first color separation with a set of inverse symmetrical templates. The step in box 186 enhances the second color separation with the same set of inverse symmetrical templates as was used to enhance the first color separation. By applying the same set of inverse symmetrical templates to each separation, it is assured that there will be no separation errors such as overlapping or blank pixels when the color separations are recombined in the step in box 188. The result of recombining the separations may be stored electronically, or may be performed directly by the printer printing the image. Enhanced separations may further be stored separately and combined later at a printer.

Figure 15:
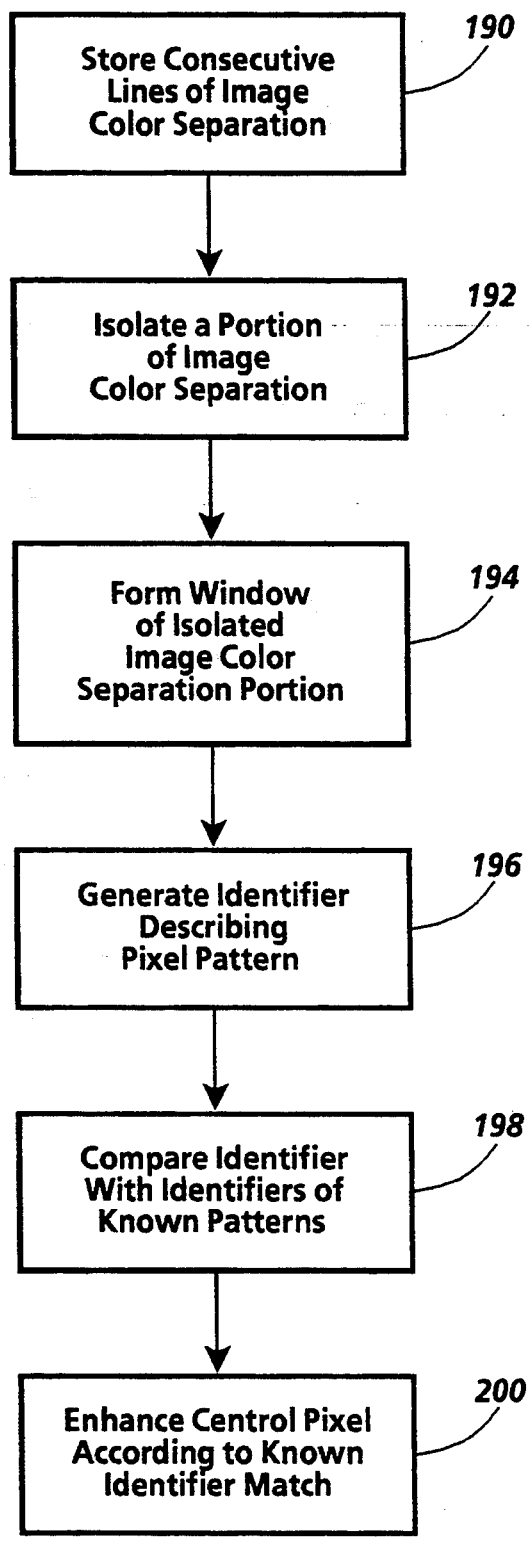
FIG. 15 describes a general technique of enhancement of a color separation by template matching.

FIG. 15 describes basic steps in enhancing an image with template matching as described in steps 184 or 186. The step in box 190 stores consecutive lines of the color separation of the image. This might be, for example, the image portion 10 shown in FIG. 1. A portion of the stored image is isolated in the step in box 192, and a window is formed in the step in box 194. An identifier describing the pixel pattern of the window is generated in the step in box 96, and in the step in box 198 the identifier is compared against identifiers of known pixel patterns or templates. In the case of the present invention, the identifier of the window is compared with inverse symmetrical template sets. The step in box 200 enhances the central pixel of the isolated window according to the matched template, indicated by the identifier. Although the enhancements shown in FIGS. 8-13 are described in relation to a two-to-one increased resolution printer, the method of the invention is clearly applicable to other printer corrections, as long as the corrections, like the templates, are inverse symmetrical, ensuring that any two color separations without previous separation errors, processed with the same template set, will be enhanced without introducing separation errors.

Figure 16:
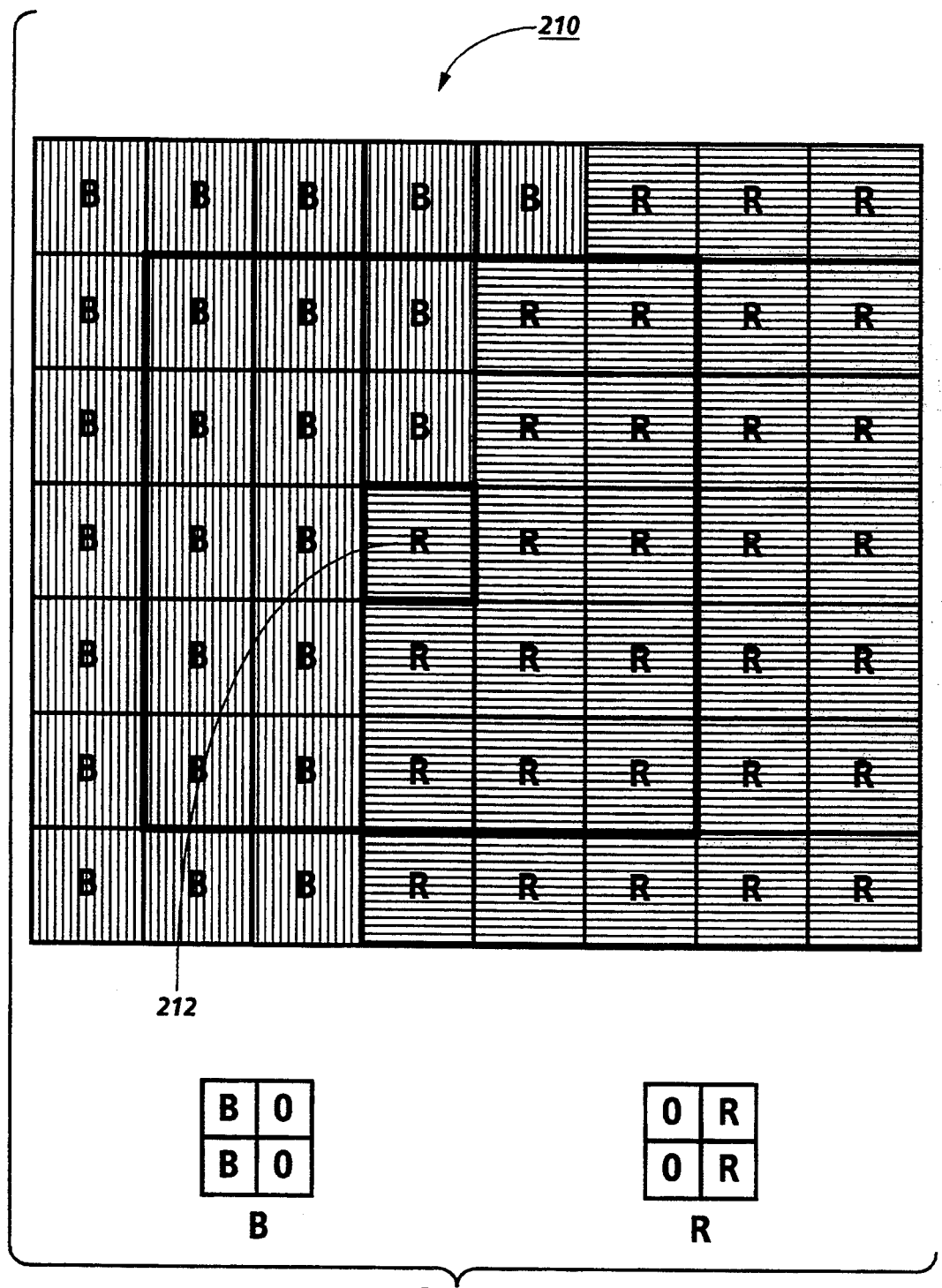
FIG. 16 describes the application of templates to a two-color image portion.

To illustrate the application of the present invention, a portion 210 of a two-color image is shown in FIG. 16. Pixel 212 is on an edge of the R portion of the image. When the area of image portion 210 that is centered about pixel 212 is analyzed in the B color separation, template 150 will be matched. When the area centered about pixel 212 is analyzed in the R color separation, the symmetrical inverse template 152 will be matched. As can be seen from FIG. 16, the corrections for each of these templates—10 and 10 for template 150 and 01 and 01 for template 152—cause a complementary correction in each separation where two of the four corrected pixels are made B color, and the complementary two pixels are made R color.

Figure 17:
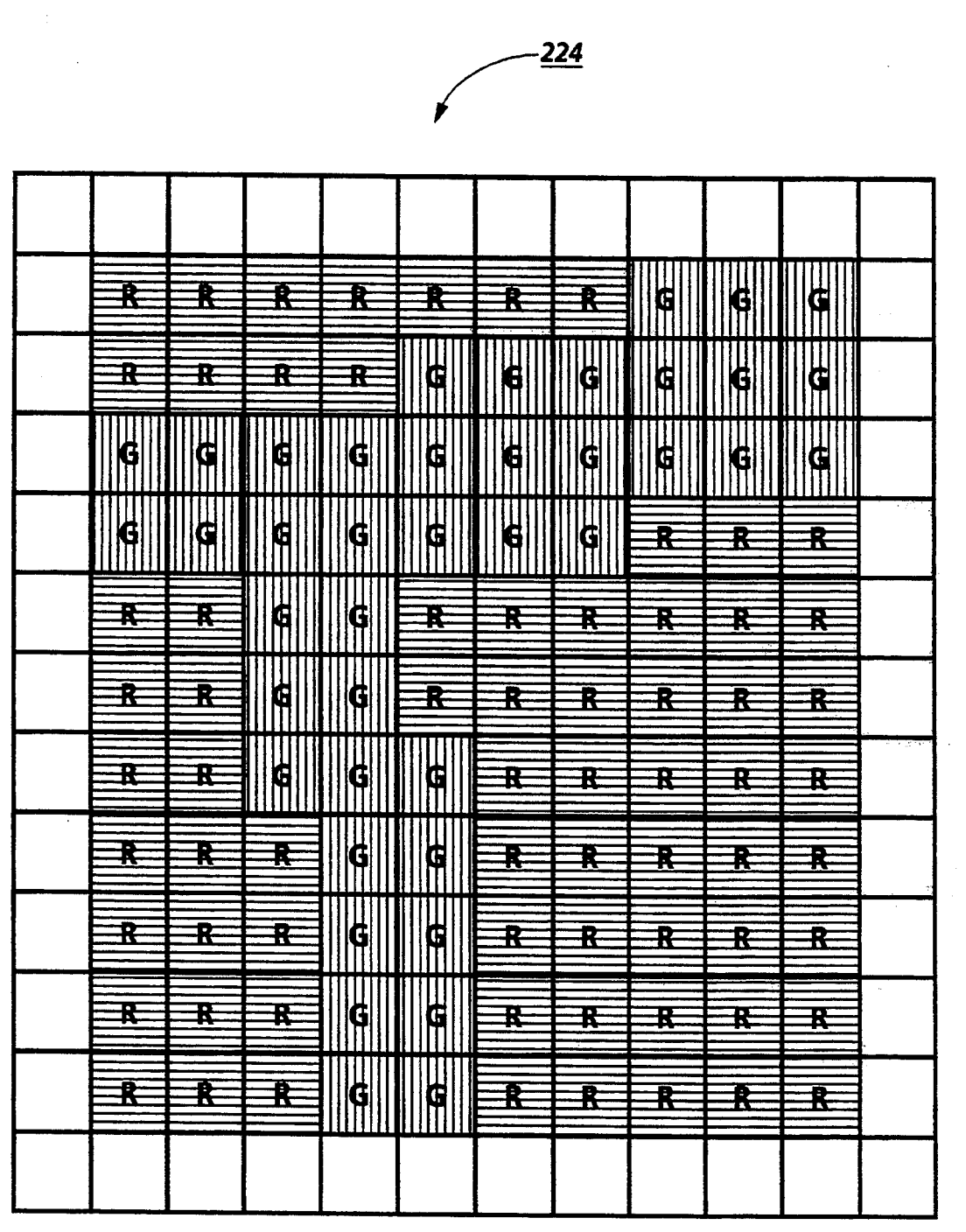
Figure 18:
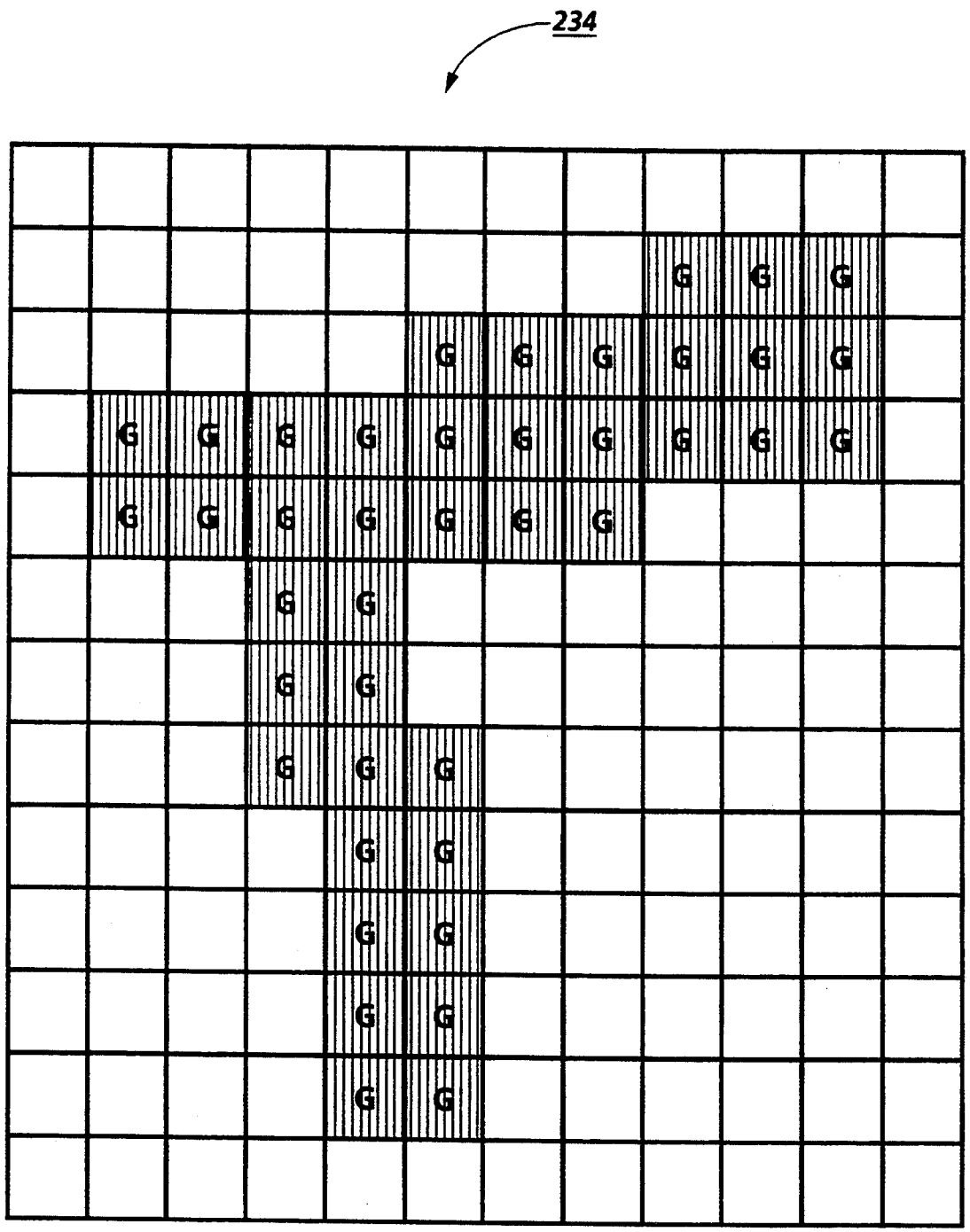
FIG. 18 shows a first color separation of the image portion of FIG. 17.
Figure 19:
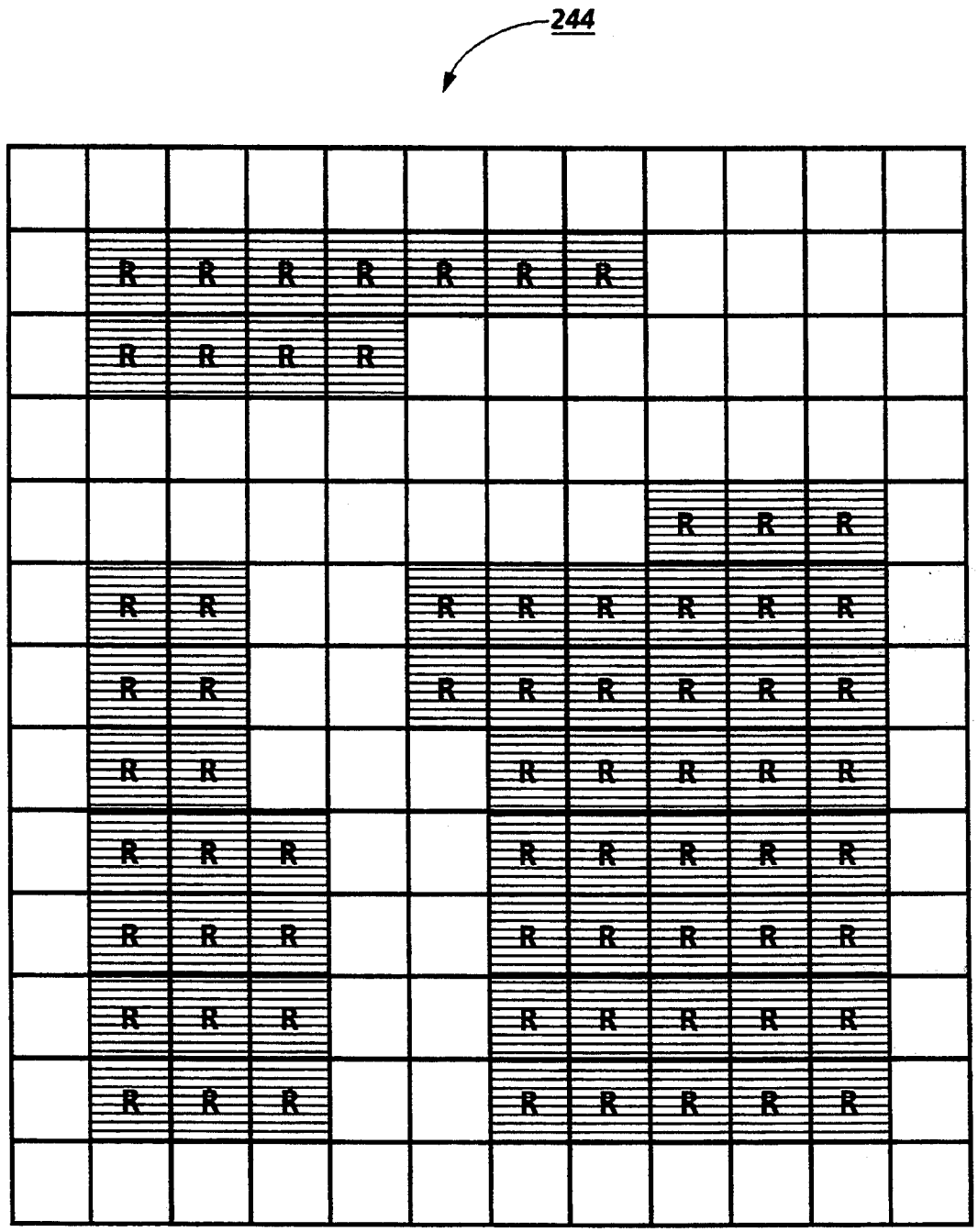
FIG. 19 shows a second color separation of the image portion of FIG. 17.

FIGS. 17-19 show a two-color image portion to be enhanced according to the method of the present invention, using the template group shown in FIGS. 11-13. In FIG. 17 is shown a two-color image portion 224, consisting of pixels of G and R colors, surrounded by a border of blank pixels. The border of blank pixels shown in the drawing is for illustrative purposes. An image portion near the outside edge of the image may be considered as if surrounded by white pixels in order to match the appropriate templates. FIG. 18 shows the G color separation 234 of image portion 224. FIG. 19 shows the R color separation 244 of image portion 224.

Figure 20:
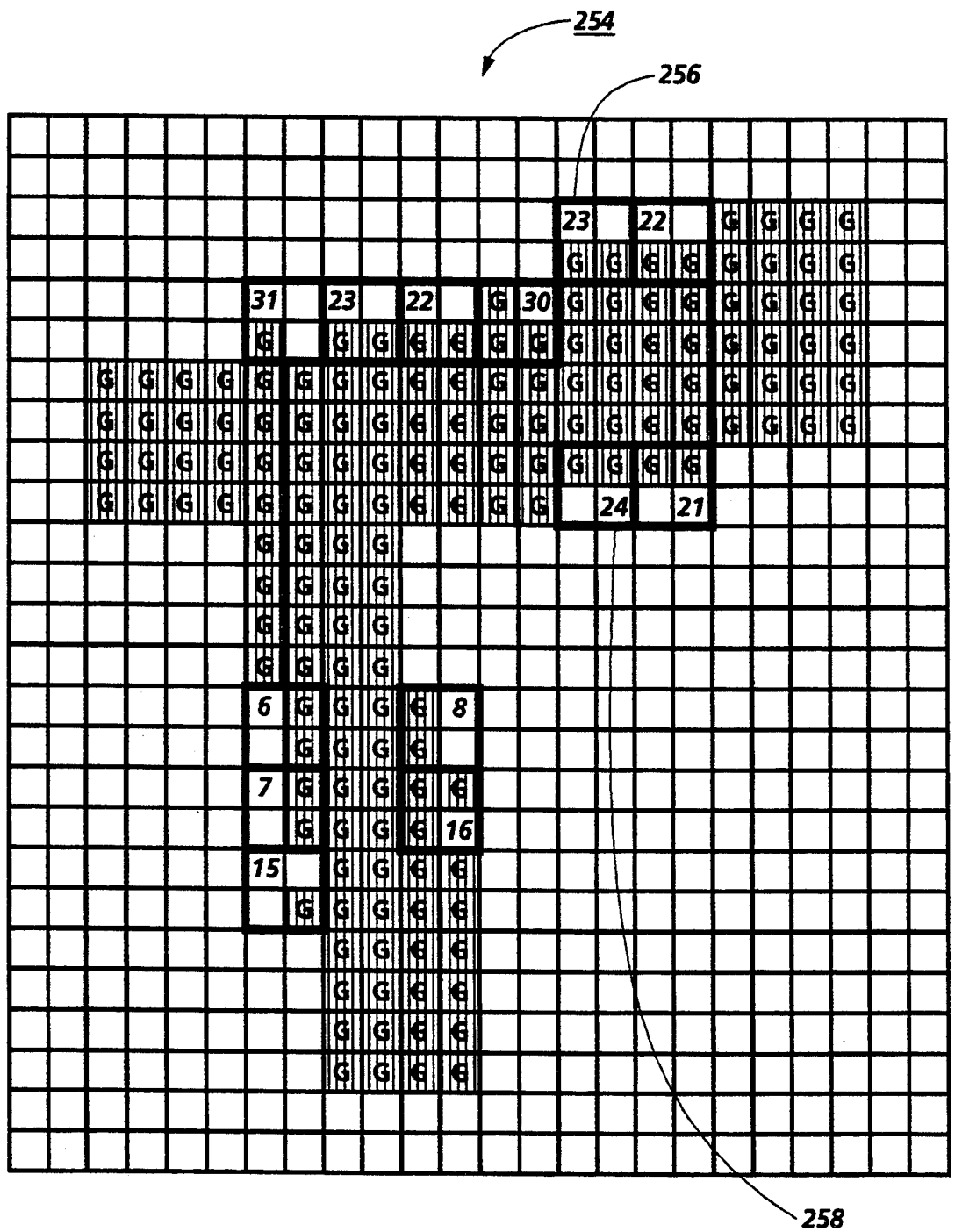
FIG. 20 shows the color separation of FIG. 18, smoothed by the method of the present invention.

When the template groups shown in FIGS. 11-13 are applied to the "G" separation 234 shown in FIG. 18, enhanced G color separation 254, shown in FIG. 20, results. Each original pixel is expanded into four enhanced pixels, and then the appropriate corrections are made according to the template set. The dark boxes delineate pixel subpatterns created as a result of a match with the indicated template. For example, box 256 shows the four subpixels which are produced for the center pixel as a result of a match of template 23 in original color separation 234. The set of subpixels 258 are created as a result of a match of template 24. It can be seen from this example that the inverse symmetrical template set further corrects similarly on either side of a line image in the color separation.

Figure 21:
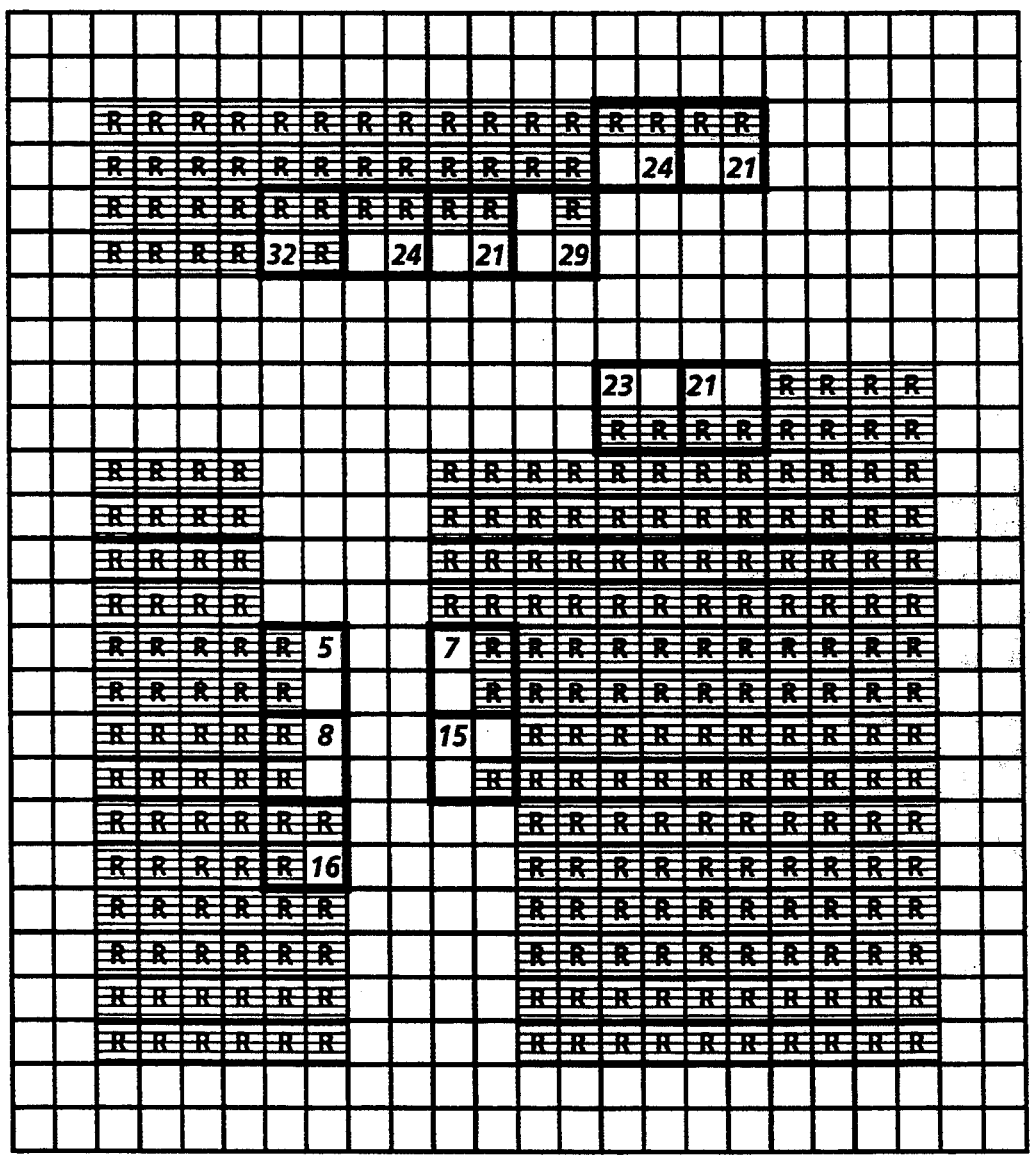
FIG. 21 shows the color separation of FIG. 19, smoothed by the method of the present invention.

When the template group shown in FIGS. 11-13 is applied to the "R" separation 244 shown in FIG. 19 in the same manner as described in relation to FIG. 20, enhanced R color separation 264, shown in FIG. 21, results.

Figure 22:
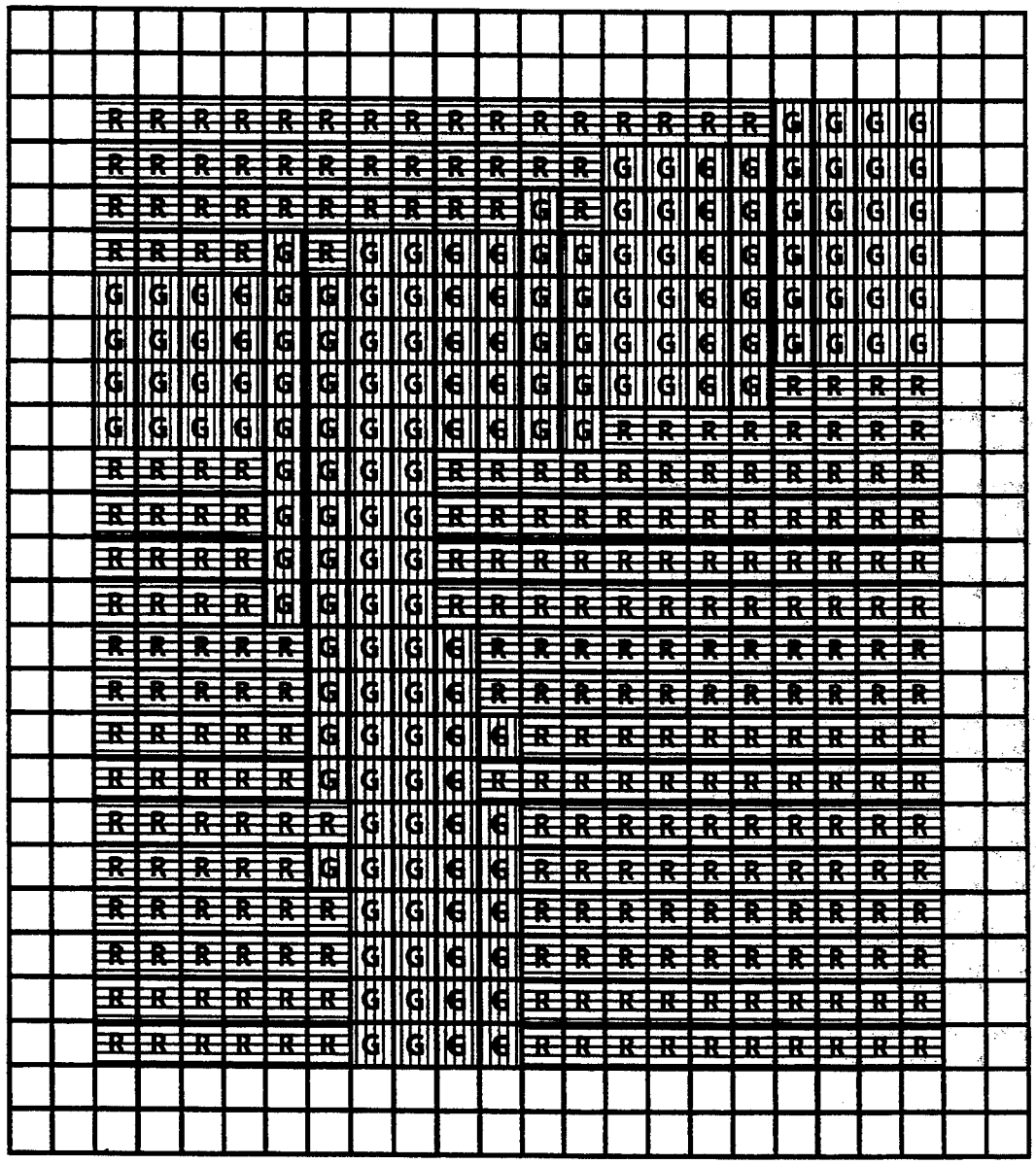
FIG. 22 shows an image portion composed of the smoothed color separations of FIGS. 20 and 21.

FIG. 22 shows enhanced image 274, created by combining enhanced color separations 254 and 264. Unlike the errors shown in FIG. 6, image 274 has no overlapping or blank pixels caused by separation errors because the corrections made to each separation are inverse symmetrical and complement each other precisely.

Although described in terms of two different colors, the same template technique clearly may be applied to black and white color separations, or black and other color separations, as well.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed is:

1. A method for enhancing the contour fidelity of printed images including first and second colors, the method comprising:

obtaining a digital representation of a portion of an image including pixels of a first color and pixels of a second color;

obtaining a first separation comprising said first color pixels in said image portion;

enhancing said first separation according to a first set of templates;

obtaining a second separation comprising said second color pixels in said image portion;

enhancing said second separation according to a second set of templates, each template in said second set being inverse to one of said first set of templates, wherein enhancements for each inverse pair of templates are symmetrical;

combining said first and second enhanced color separations.

2. The method of claim 1, wherein said set of inverse symmetrical templates comprises:

a first template comprising pixels of a target color representing an edge of an image at an angle, adjacent pixels of a blank color, and other pixels of undetermined color;

a second template comprising pixels in which said target color pixels of said first template are replaced by blank color pixels, and said blank color pixels of said first template are replaced by pixels of a target color;

a third template comprising said first template pixels shifted 180 degrees; and a fourth template comprising said second template pixels shifted 180 degrees.

3. The method of claim 2, wherein each template includes a central correctable target pixel, and wherein each template further has an associated pattern of subpixels for correcting said central correctable target pixel, a subpixel pattern associated with said first template being complementary to a subpixel pattern associated with said second template, and a subpixel pattern associated with said third template being complementary to a subpixel pattern associated with said fourth template.

4. The method of claim 3 wherein:
said step of enhancing said first separation according to a set of inverse symmetrical templates further comprises producing for a pixel in a first position in the image portion a first set of subpixels representing said pixel according to a first matched template; and said step of enhancing said second separation according to a set of inverse symmetrical templates further comprises producing for a pixel in said first position in the image portion a second set of subpixels representing said pixel according to a second matched template, said first and second matched templates being inverse symmetrical, and said first set of subpixels and said second set of subpixels being complementary.

5. The method of claim 1 wherein said step of enhancing said first separation with a set of inverse symmetrical templates further comprises the steps of:
storing a portion of said first separation pixels;
isolating a region of said stored pixels of said separation portion to form a window including a central pixel and a formation of pixels surrounding said central pixel;
comparing a group of pixels encompassing pixels surrounding said central pixel and within said window with a set of inverse symmetrical pixel patterns;
identifying a matching pixel pattern; and
enhancing said central pixel according to said matching pixel pattern with a set of subpixels associated with said matching pixel pattern.

6. The method of claim 5, wherein said step of enhancing said central pixel further comprises producing a set of subpixels associated with said matching pixel pattern, said subpixels being comprised of said first color pixels and blank pixels.

7. A method for enhancing the contour fidelity of printed images including first and second colors, the method comprising;
obtaining a digital representation of a portion of an image including pixels of a first color and pixels of a second color;
obtaining a first color separation comprising said first color pixels in said image portion and blank pixels;
enhancing said first separation according to a set of inverse symmetrical templates, said enhancement for each of said first color pixels comprising a pattern of subpixels of first color subpixels and blank subpixels;
obtaining a second separation comprising said second color pixels in said image portion and blank pixels;
enhancing said second separation according to said set of inverse symmetrical templates, said enhancement for each of said second color pixels comprising a pattern of subpixels of second color subpixels and blank subpixels, said second color subpixel pattern being complimentary to said first color subpixel pattern; and
combining said first and second enhanced color separations.

8. A method of enhancing the contour fidelity of a first image represented by a plurality of pixels at a first resolution, said first resolution pixels including pixels of a first color and pixels of a second color, in a second image represented by a plurality of pixels at a second magnified resolution, said second resolution pixels including pixels of the first color and pixels of the second color, comprising the steps of:
obtaining a digital representation of a portion of an image including pixels of a first color and pixels of a second color;
isolating a region of the pixels of said image portion including a pixel formation comprising a central pixel and pixels surrounding said central pixel;
obtaining a first color separation of said region comprising said first color pixels in said pixel region and blank pixels;
enhancing said central pixel in said first color separation according to a set of inverse symmetrical templates, said enhancement for each of said first color pixels comprising a pattern of subpixels of first color subpixels and blank subpixels;
obtaining a second color separation of said region comprising said second color pixels in said image portion and blank pixels;
enhancing said central pixel in said second separation according to said set of inverse symmetrical templates, said enhancement for each of said second color pixels comprising a pattern of subpixels of second color subpixels and blank subpixels; and
combining said first and second enhanced color separations.

9. The method of claim 8, wherein said second color subpixels of said enhancement of said central pixel of said second separation are complimentary to said first color subpixels of said enhancement of said central pixel of said first separation.

* * * * *